(No Model.) 3 Sheets—Sheet 1.
C. MARTINCOURT.
MOWER.
No. 453,402. Patented June 2, 1891.
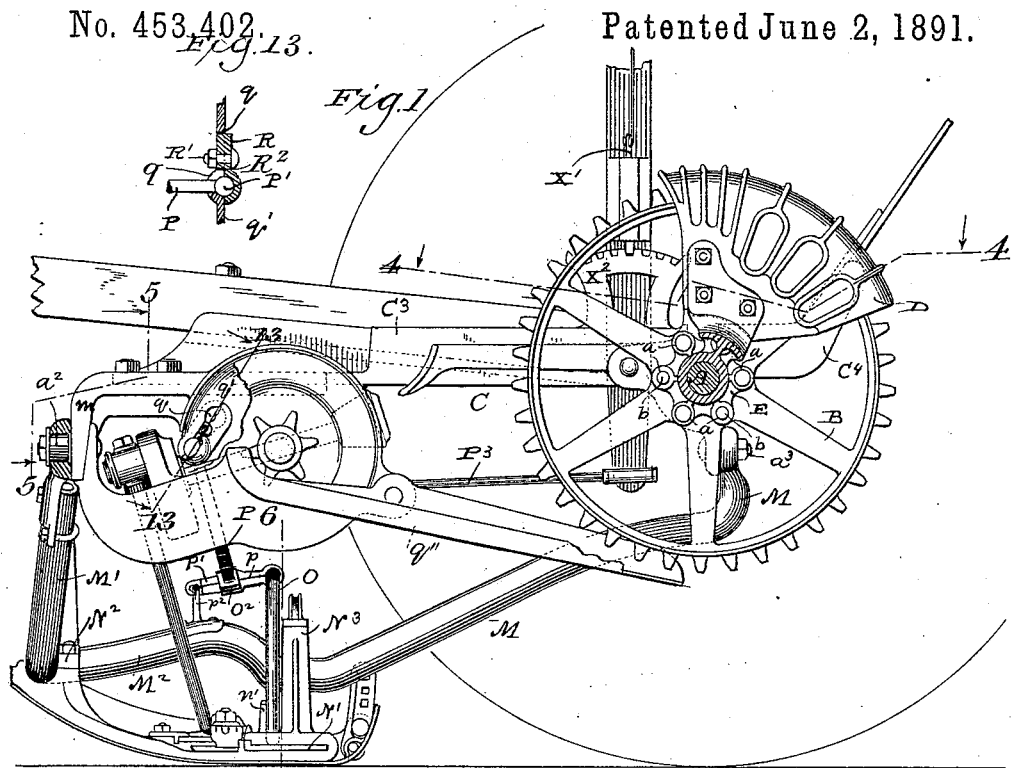
Fig. 13.
Fig. 1.
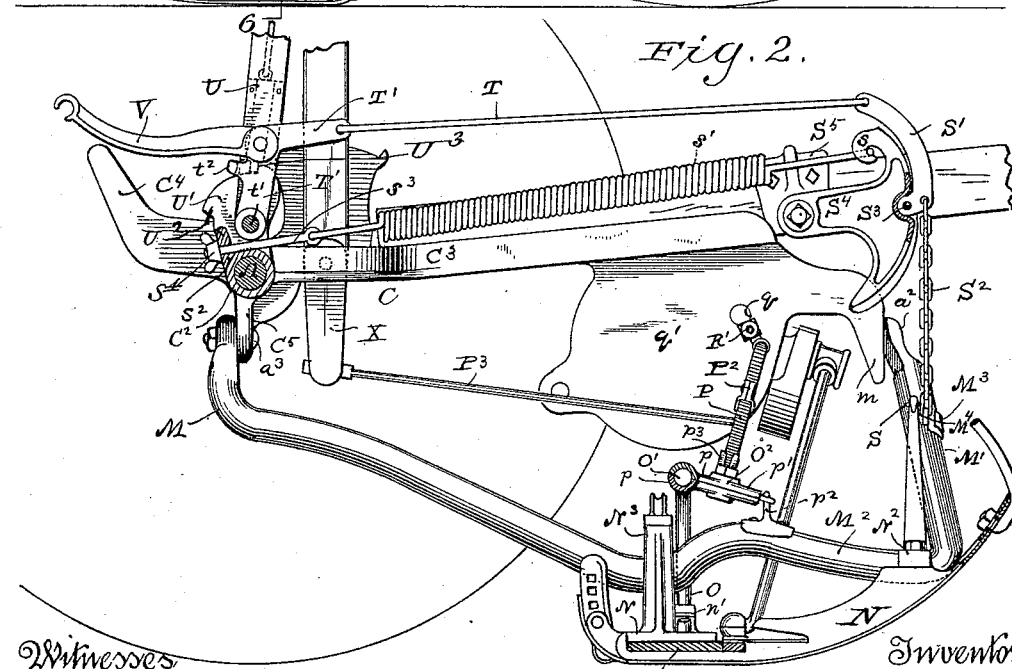
Fig. 2.
Witnesses
Geo. W. Young
Wm. Klug
Inventor
Charles Martincourt
By Stout & Underwood
Attorneys

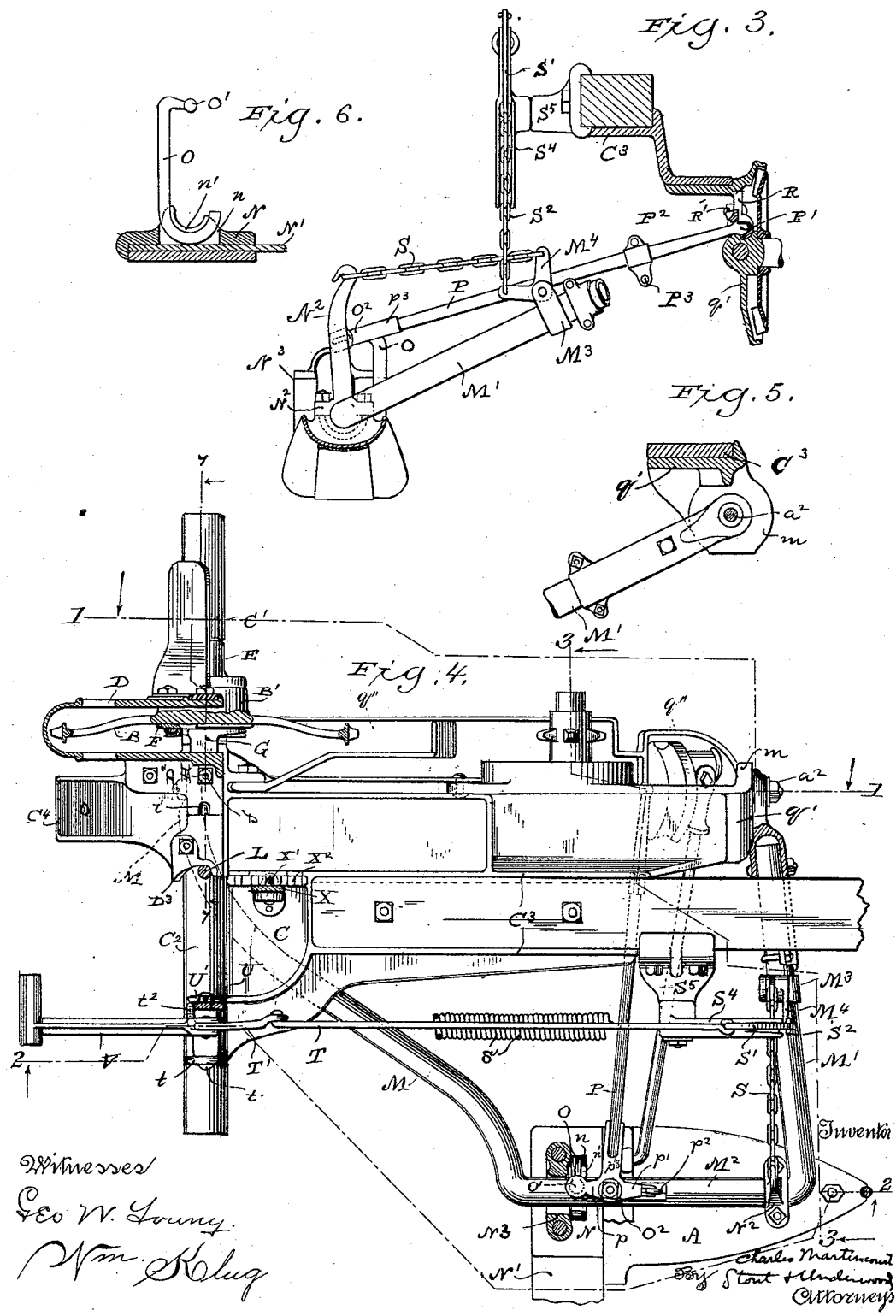

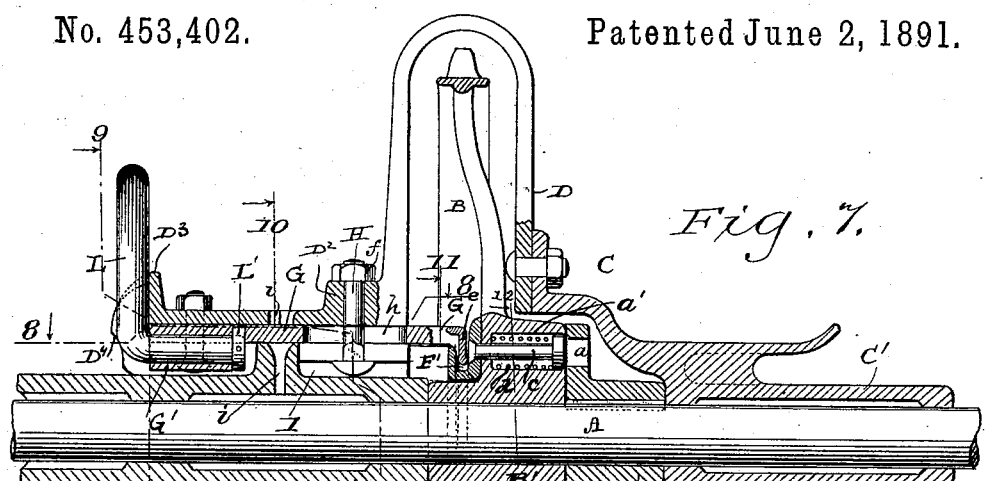
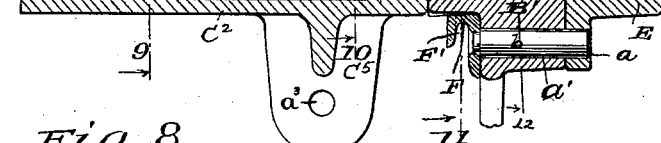
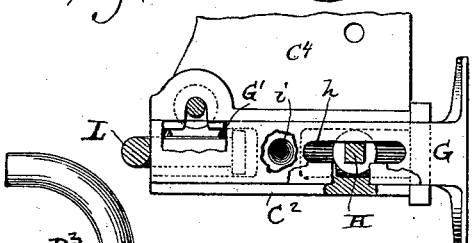
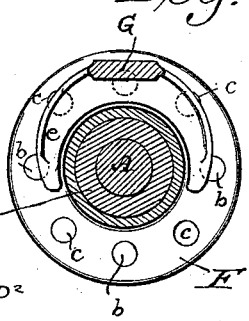
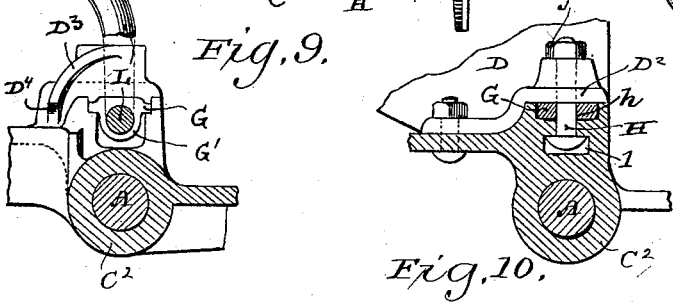
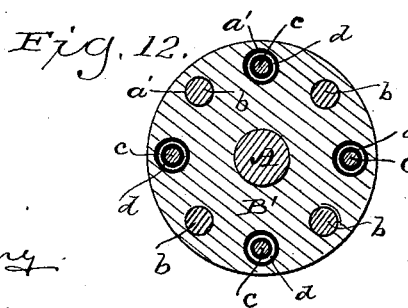

UNITED STATES PATENT OFFICE.

CHARLES MARTINCOURT, OF MILWAUKEE, WISCONSIN, ASSIGNOR TO THE MILWAUKEE HARVESTER COMPANY, OF SAME PLACE.

MOWER.

SPECIFICATION forming part of Letters Patent No. 453,402, dated June 2, 1891.

Application filed May 23, 1889. Serial No. 311,809. (No model.)

*To all whom it may concern:*

Be it known that I, CHARLES MARTINCOURT, of Milwaukee, in the county of Milwaukee, and in the State of Wisconsin, have invented certain new and useful Improvements in Mowers; and I do hereby declare that the following is a full, clear, and exact description thereof.

My invention relates to "two-wheeled front-cut hinge-joint" mowers or harvesters; and the invention consists in certain peculiar and novel features of construction and arrangement, as hereinafter described, and pointed out in the appended claims.

In order that my invention may be fully unstood, I will proceed to describe it with reference to the accompanying drawings, in which—

Figure 1 is an elevation of the stubble side of the machine, partly in section on the line 1 1 of Fig. 4. Fig. 2 is a similar elevation of the grain side thereof, partly in section on the line 2 2 of Fig. 4. Fig. 3 is a front elevation of the devices for adjusting the cutter-bar, partly in section on the line 3 3 of Fig. 4. Fig. 4 is a plan view of the machine with its carrying-wheels removed, partly in section on the line 4 4 of Fig. 1. Figs. 5 and 6 are detail sectional views on the lines 5 5 and 6 6, respectively, of Fig. 1. Fig. 7 is a transverse vertical section on the line 7 7 of Fig. 4. Figs. 8, 9, 10, 11, and 12 are detail sectional views on the lines 8 8, 9 9, 10 10, 11 11, and 12 12, respectively, of Fig. 7; and Fig. 13 is a detail sectional view on the line 13 13 of Fig. 1.

In the drawings, A designates the axle, which turns with wheels mounted on each end, and B designates a sprocket-wheel which is mounted loosely upon the shaft A nearer one end than the other thereof.

C designates the frame of the machine, which is made in two sections $C'$ $C^2$, the tubular portions of which embrace the axle A at opposite sides of the hub $B'$ of sprocket-wheel B.

D designates a segmental shield which arches over the sprocket-wheel B, and which is bolted at one side to the inner end of the frame-section $C'$. The opposite side of this shield is formed with an extension $D^2$, which projects over the upper side of frame-section $C^2$, and the said shield D is strengthened by means of ribs arranged radially around its segmental edge, as best illustrated in Fig. 1, which ribs enable said shield to perform the functions of a truss connecting or uniting the two members of the frame. Previous to my present invention it was found in practice that when the frame was all on one side of the driving sprocket-wheel B, then the weight of said frame would cause the axle to sag downward at or about the point where the driving-sprocket B was keyed to the axle, and that when I connected the two sections of the main frame on each side of said driving-sprocket B by a shield the axle still sagged at this point, and caused a cramping, making the machine run hard, and to obviate this I formed the said shield D with the described radial strengthening-ribs, which accomplish the desired result.

G designates a slide which works in a longitudinal groove on the upper side of the frame-section $C^2$, and which is retained therein by a bolt H. This bolt extends head downward into a longitudinal slot $l$ in frame-section $C^2$, said slot being T-shaped in cross-section, so as to confine the head of the bolt, and said bolt extends also through a longitudinal slot $h$ in the slide G. The upper end of this bolt extends through the extension $D^2$ of shield D and receives a nut $f$ on its upper end. Thus the shield D is connected by the bolt H to the frame-section $C^2$, and the extension $D^2$ serves to retain the slide G in the groove on the upper side of the frame-section, while also permitting the required longitudinal movements of the slide.

The slide G is formed at its outer end with a flange $e$, which extends downwardly into a circumferential groove $F'$ of a collar F, the said collar being arranged to slide on the hub $B'$ of the sprocket-wheel B. This hub is formed with an annular series of transverse openings $a'$ $a'$. Clutch-pins $b$ $c$ work alternately in these openings $a'$ $a'$, and their inner ends are riveted to the collar F. The pins $c$ are each surrounded by a spiral spring $d$, which is confined between the head at the outer end of the pin and the inner end of the opening $a'$, in which said pin works. The pins $b$ are longer than the pins $c$ and extend outward through the openings $a'$ into annularly-arranged openings (marked $a$) in a collar E, which is splined upon the axle A, adjacent to the outer end of the hub B' of sprocket-wheel B. On its inner end the slide G is formed with a pivot-socket G' for the horizontal arm of a foot-lever L, and the outer end of this horizontal arm carries a collar or head L', which retains said part of the arm in the bearing G' and extends upward into a transverse slot in said slide. The vertical arm of this foot-lever extends upward adjacent to a vertically-inclined cam $D^3$. The lower end of cam $D^3$ is formed with a recess $D^4$, and the arrangement is such that when the foot-lever L is depressed by the driver it engages the cam $D^3$ and is moved toward the grain side of the machine. This movement draws the slide G and ring or collar F in corresponding direction, and also withdraws the pins $b$ from engagement with collar E, and consequently throws sprocket-wheel B out of gear, rendering the cutters idle. When fully depressed, the lever L is held so by engagement with the recess $D^4$ of cam $D^3$, and when released therefrom the parts are returned to their normal positions by the springs $d$ of pins $c$, so that the sprocket-wheel B is brought into gear with axle A through the medium of collar E. An inlet hole or opening $i$ is formed in extension $D^2$ and section $C^2$; and it will be seen that if oil be poured into said opening it will flow down upon slide G and through the slot $h$ thereof through frame-section $C^2$, and thus thoroughly lubricate the bearing-surfaces of said parts.

The tongue-socket $C^3$ (which may be of any ordinary or preferred construction) is preferably cast integrally with the frame-section $C^2$, and extends forward therefrom, as shown, while the support $C^4$ for the seat-standard (which is also preferably cast integrally with the said frame-section) extends rearwardly from the latter. In the illustration given this tongue-socket $C^3$ is, as stated, cast all in one piece. It is an irregular casting longitudinally recessed for the reception of the tongue, which latter is bolted to the intermediate bottom web of the said casting, as shown by bolts in Fig. 4, said bottom web being shown at the point marked $C^3$ in Fig. 3, the said tongue being shown in section in said Fig. 3 resting on said bottom web. On each side of the tongue the casting $C^3$ has vertical sides or flanges of different lengths, the longer of said sides or flanges being shown in section on the right of said tongue in Fig. 3, and the other side or flange being concealed in Fig. 3 by the projection $S^5$, bolted to the said tongue just at the end of the shorter of said sides or flanges, as clearly shown in Fig. 4. The longer side or flange of the casting $C^3$ is shown in Fig. 4 as extended laterally into an oblong parallelogram, which is recessed to form a tool-box, this being shown in said Fig. 4 adjacent to and extending from the part $C^2$ of the frame of the machine, this tool-box part being also shown at the point lettered $C^3$ in Fig. 1, while the shorter side or flange of said casting is shown at the point marked $C^3$ in Fig. 2. As stated, however, this tongue-socket casting may be of any ordinary or preferred construction rather than that just described, this being wholly immaterial so far as my invention is concerned, and a mere matter of convenience or mechanical skill.

I have not deemed it necessary to letter the tongue, nor the various attaching-bolts referred to, the same being plainly shown in the several figures of the drawings.

Upon the under side of the frame-section $C^2$ is cast a pendent lug $C^5$, and to this lug is pivoted at $a^3$ the upper end of the shoe-support M. The shoe N of the finger-bar N' is attached to the portion $M^2$ of the support M by the bifurcated base of a standard $N^2$, which is formed upon the upper side of the shoe. From this point of attachment the support M extends upward as an arm M', the upper end of which is pivoted at $a^2$ to a flange $m$ on the front end of a shield $q'$, secured to the under side of the tongue-socket $C^3$. The heel of the shoe N is formed with an aperture $n$, which is bridged by a curved plate $n'$. Beneath this curved plate and within the opening $n$ in the shoe extends the curved lower end of a hanger O, (see Fig. 6,) the upper end of which is slightly bent and terminates in a ball O'. This ball is inserted into a socket in one end of an arm $p$ of a T-lever $O^2$. The opposite arm $p'$ of this lever is formed with an eye to receive the hooked upper end of a stud $p^2$ on the upper side of part $M^2$ of the shoe-support M. The central arm $p^3$ of this T-lever $O^2$ is connected by a rocking arm P to the shield $q'$, which is pendent from the under side of the tongue-socket $C^3$, as stated, the said shield being secured to the said part $C^3$ by ordinary bolts. (Not shown.) In Figs. 3 and 5 the upper part of this shield $q'$ is shown in section just below and partly to the right of the depressed portion of the part $C^3$, which is also shown in section, resting on the said shield, which latter has the described flange $m$, projecting downwardly from its front end, as shown in Figs. 1, 4, and 5, and a horizontal extension at one side which serves as a shield for the gear-wheel shown in Fig. 3. A key-hole slot $q$ is formed nearly vertically in the shield $q'$, the enlarged portion of the slot being at the upper end of the slot. A ball P', which is formed on the upper end of rocking arm P, is inserted through the enlarged portion of the slot and is then brought downward behind its reduced portion. In order to retain the upper end of this rocking arm within the slot $q$, a plate R is secured over the upper part of the slot and against the stubble side of the shield by a bolt and nut R'. This plate is formed with a projection $R^2$ to enter the enlarged portion of the slot $q$ above the upper end of the rocking arm P, and thus prevent the plate R from turning upon its bolt; and the lower end of this plate is preferably formed with a cavity to receive the upper end of the arm P and permit it to turn in the slot. The rocking arm P carries about midway of its length a lug P², clamped or otherwise formed thereon, and to the lower end of this lug is attached the front end of a rod or link P³. The rear end of this rod is connected to the lower end of a lever X, which is pivoted upon the tongue-socket C⁵, so as to extend upward within convenient reach of the driver. This lever carries a grip-pawl X', which engages the teeth of a quadrant X², secured to the adjacent part of the tongue-socket C³. By means of this lever X and link P³ the arm P is turned axially to adjust the front end of the shoe vertically in the line of travel of the machine.

The arm M' of the shoe-support M is embraced by a split collar M³, the joining rivet or bolt of which constitutes the attaching-pivot of a bell-crank lever M⁴. (See Fig. 3.) One arm of this lever is connected by a chain S with the hooked upper end of the standard N², before referred to, and to the opposite arm of said lever is connected a chain S². The opposite end of this chain is connected to an arm or lever S', which is pivoted at S³, near the point of attachment of the chain S², upon the outer end of a segment-head S⁴. The head S⁴ is pivoted at its rear end upon a stud projecting laterally from a bracket S⁵, which is bolted to the tongue and projects therefrom, as shown in Figs. 2 and 3, adjacent to the outer end of the shorter side or flange of the tongue-socket C³. The arm or lever S' is curved to conform to the shape of the segment-head S⁴, and to its upper end is connected the front end of a rod or link T, the rear end of which is connected to the upper front end of an L-shaped lever T'. The lower end of this lever T' is pivoted by a pin or bolt t' between a lug t and a quadrant U', which project from the upper side of the frame-section C². U designates an upright lever, the lower end of which is pivoted upon the pin or bolt t' and between one side of the lever T' and the adjacent stud t. The lever T' carries a horizontal stud t², which extends laterally across the rear edge of the lever U, so that when said lever U is moved backward it shall engage the lever T'. The lever U is provided with the usual grip-pawl, as indicated by the dotted lines in Fig. 2, and a quadrant U', secured to an adjacent part of the frame-section C², is provided with projections U² U³ (the latter being shown in dotted lines in Fig. 2) to limit the movements of lever U by engaging the pawl thereof. Upon the bend of lever T' is secured a foot-lever V, which extends rearwardly to within convenient reach of the driver's foot. Thus it will be seen that the lever T' may be actuated either by hand (through the medium of lever U) or by foot, (through the medium of the lever V.) In either event the cutter-bar is raised bodily by lever T', acting through link T, segment-head S⁴, lever S', chain S², and bell-crank M⁴ upon the part M' of support M simultaneously with the pivotal movement of the bar or support M', acting through bell-crank M⁴, chain S, and standard N², secured to the shoe of said cutter-bar. In order to provide a yielding support for the shoe, the upper end of the segment-head S⁴ is formed with a hook s, to which is connected one end of a spring s', the opposite end of which is connected to the front end of a link s³. This link extends through a flange s², which projects upward from the frame-section C², and its rear protruding end receives a tension-nut s⁴, by means of which the yielding and supporting action of the spring is regulated as desired.

From the foregoing description it will be seen that I have produced a very simple and durable machine, the several parts of which can be readily assembled in setting up the machine and also easily duplicated when worn out or otherwise rendered useless. The cutter-bar and shoe are readily adjusted by direct movements of the adjusting devices and the machine as a whole is compact and of light draft.

Having thus described my invention, what I claim as new therein, and desire to secure by Letters Patent, is—

1. The combination, with the machine-frame carrying the tongue-socket, a bent arm constituting the shoe-support and pivoted at one end upon the machine-frame and at the opposite end upon the tongue-socket, and a cutter-shoe carrying a vertical standard, of a segment-head pivoted upon a projection on the tongue, a yielding connection between the frame and said segment-head for supporting the latter, a lever pivoted upon the segment-head, a lifting-lever pivoted upon the machine-frame, a bell-crank lever pivoted upon the front part of the shoe-support, a chain connecting one arm of the bell-crank to the shoe-standard, a chain connecting the opposite arm of the bell-crank to the segment-head lever, and a rod connecting said lever to the lifting-lever, substantially as described.

2. The combination, with a segment-head pivoted upon the front part of the machine-frame and an elastic or yielding connection between the rear part of the frame and the upper portion of the segment-head, of a lever pivoted upon said segment-head, lifting mechanism connected to the upper end of said segment-head lever, and a chain connecting the segment-lever with the shoe-support, substantially as described.

3. The combination, with the shoe-support pivoted upon the machine-frame, of a shoe, a rocking shaft having a T-shaped head and rocking connections, a loose connection between the rear end of the shoe and one arm of said T-shaped head, and another loose connection between the other end of the T-shaped head and the shoe-support, substantially as described.

4. The combination, with the rocking shaft and its rocking connections, of the T-shaped head, the hanger, a loose connection between one arm of the T-shaped head and the shoe-support, and a loose connection between the opposite arm of the T-shaped head and the shoe, substantially as described.

5. The combination, with the axle of the machine, a frame mounted on said axle and provided with a cam, of a collar splined on the axle, a driving sprocket-wheel, also mounted on said axle, spring-actuated pins carried by a ring surrounding the hub of the sprocket-wheel, said pins passing through the wheel and normally projecting into the collar, a slide mounted on the machine-frame and engaging the said ring, and a lever carried by the slide and engaging the cam to draw said pins from the collar, substantially as described.

In testimony that I claim the foregoing I have hereunto set my hand, at Milwaukee, in the county of Milwaukee and State of Wisconsin, in the presence of two witnesses.

CHARLES MARTINCOURT.

Witnesses:
S. S. STOUT,
H. G. UNDERWOOD.